US012517755B2

(12) United States Patent
Sohail et al.

(10) Patent No.: US 12,517,755 B2
(45) Date of Patent: Jan. 6, 2026

(54) RUNTIME TECHNIQUES FOR DETECTING ANTI-PATTERNS CAUSING PERFORMANCE ISSUES

(71) Applicant: APPLE INC., Cupertino, CA (US)

(72) Inventors: Hamza B. Sohail, San Jose, CA (US); Joel Middendorf, Cupertino, CA (US); Han Ming Ong, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 411 days.

(21) Appl. No.: 18/204,877

(22) Filed: Jun. 1, 2023

(65) Prior Publication Data

US 2023/0393887 A1 Dec. 7, 2023

Related U.S. Application Data

(60) Provisional application No. 63/365,852, filed on Jun. 3, 2022.

(51) Int. Cl.
G06F 9/46 (2006.01)
G06F 9/48 (2006.01)
G06F 9/52 (2006.01)

(52) U.S. Cl.
CPC .............. G06F 9/485 (2013.01); G06F 9/526 (2013.01)

(58) Field of Classification Search
CPC ................................ G06F 9/485; G06F 9/526
See application file for complete search history.

(56) References Cited

U.S. PATENT DOCUMENTS

| 5,872,909 A | 2/1999 | Wilner et al. |
| 9,454,351 B2 | 9/2016 | Anderson et al. |
| 9,600,393 B2 | 3/2017 | Golde et al. |
| 9,632,914 B2 | 4/2017 | Cheng et al. |
| 9,672,139 B2 | 6/2017 | Peng |
| 9,870,307 B2 | 1/2018 | Topiwala et al. |
| 9,910,760 B2 | 3/2018 | Kiel et al. |

(Continued)

FOREIGN PATENT DOCUMENTS

EP 1115061 A2 7/2001

OTHER PUBLICATIONS

Apple.com [online], "Diagnosing issues using crash reports and device logs," May 6, 2021, retrieved on Jan. 25, 2024, retrieved from URL<https://developer.apple.com/documentation/xcode/diagnosing-issues-using-crash-reports-and-device-logs>, 4 pages.

(Continued)

Primary Examiner — Gregory A Kessler
(74) Attorney, Agent, or Firm — Fish & Richardson P.C.

(57) ABSTRACT

Techniques may include launching an application and inserting a dynamic library into the application. An intercept wait function can intercept a target thread's call for a semaphore wait function. The semaphore wait function may request adding the target thread to a wait queue. The wait list of a table may be checked for the target thread. The table can store entries in the wait list or a signal list where an entry may include a quality-of-service category and a hang flag for a thread. The entry representing the target thread may be created after determining that the entry is not in the wait list. The semaphore wait function can enqueue the target thread to the wait queue. The target thread can be compared to entries in the signal list. The hang flag for the entry representing the target thread can be updated based on the comparison.

20 Claims, 9 Drawing Sheets

(56) References Cited

U.S. PATENT DOCUMENTS 11,151,020 B1 10/2021 Bajoria
2009/0320021 A1 12/2009 Pan et al.

OTHER PUBLICATIONS

Microsoft.com [online], "iOS Symbolication," Aug. 31, 2022, retrieved on Jan. 25, 2024, retrieved from URL<https://learn.microsoft.com/en-us/appcenter/diagnostics/ios-symbolication>, 6 pages.
Horatiu et al., "Deadlock Immunity: Enabling Systems to Defend Against Deadlocks", Senix, Usenix, The Advanced Computing Systems Association, Feb. 25, 2019, pp. 295-308.
International Search Report and Written Opinion Issued in PCT Application No. PCT/US2023/024369, dated Sep. 6, 2023 in 14 pages.

Priority Inversion Flagging Policy

| | Signaller Thread - QoS User Interactive | Signaller Thread - QoS User Initiated 106 | Signaller Thread - QoS Background 114 | Signaller Thread - QoS Utility 110 | Signaller Thread - QoS Default | Signaller Thread - QoS Unspecified 120 |
|---|---|---|---|---|---|---|
| Waiter Thread - QoS User Interactive 116 | No Inversion | Inversion but suppressed 118 | Inversion Called Out | Inversion Called Out | Inversion Called Out | Inversion Called Out |
| Waiter Thread - QoS User Initiated 104 | No Inversion | No Inversion 102 | Inversion Called Out 112 | Inversion Called Out 108 | Inversion Called Out | Inversion Called Out 122 |
| Waiter Thread - QoS Background 126 | No Inversion | No Inversion | No Inversion | No Inversion | No Inversion | Ignore 124 |
| Waiter Thread - QoS Utility | No Inversion | No Inversion | No Inversion | No Inversion | No Inversion | Ignore |
| Waiter Thread - QoS Default | No Inversion | No Inversion | Ignore | Ignore | Ignore | Ignore |
| Waiter Thread - QoS Unspecified | Ignore | Ignore | Ignore | Ignore | Ignore | Ignore |

RUNTIME TECHNIQUES FOR DETECTING ANTI-PATTERNS CAUSING PERFORMANCE ISSUES

FIELD

The present disclosure relates generally to techniques for surfacing and detecting performance issues for testing of beta and various commercial release versions of applications for electronic devices.

BACKGROUND

Application users can be concerned with application response time. For instance, some thread activity of the application can increase the risk of a hang or freeze where an application stops responding to input. Measuring potential responsiveness issues can be difficult for third party developers because of the complexity of modern operating systems. Prior efforts to detect such issues were often performed after the application was released.

BRIEF DESCRIPTION OF THE DRAWINGS

FIG. 1 is a table showing a priority inversion flagging policy according to an embodiment.

FIG. 5 shows a display from an integrated development environment (IDE) according to an embodiment.

Figure 2:
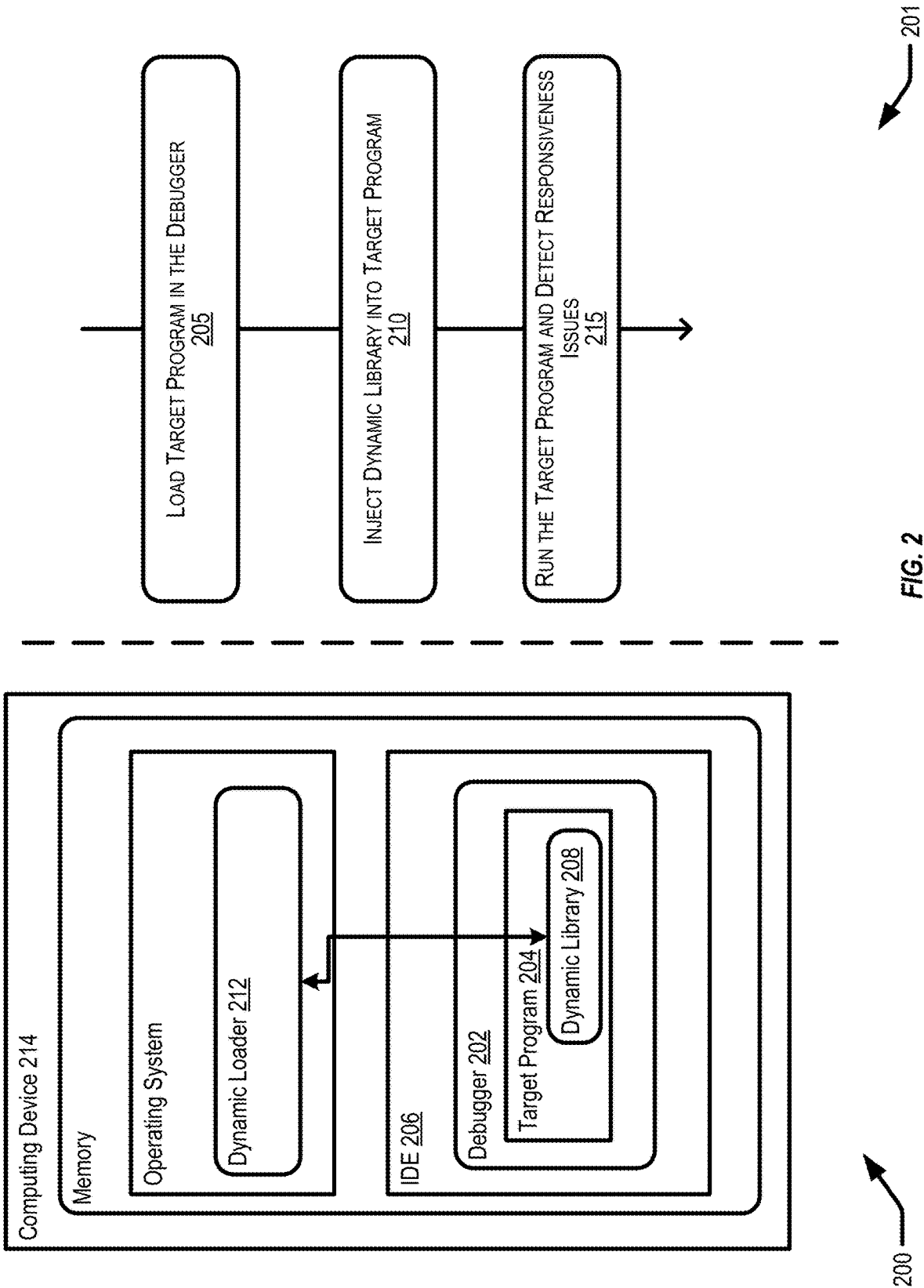
FIG. 2 shows a diagram and method for identifying potential responsiveness issues using a single computing device according to an embodiment.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments of the present disclosure relate to devices, computer-readable medium, and methods for identifying potential responsiveness issues, and providing these performance issues in an integrated development environment (IDE) for developers to examine for optimizing their applications. A performance anti-pattern can be common causes of problems in code that can lead to performance issues.

A thread can be a sequence of instructions that can be managed by an operating system's scheduler. A program can include one or more threads and the order in which threads are executed by a computing system's processor(s) can impact the program's responsiveness. For instance, a program may have a slow response time if a thread for a user interface is waiting while a thread for a background process is executing. Threads can be assigned priorities so that the threads with a larger impact on performance are executed before lower priority threads. The priority for a thread can be represented by a quality of service (QoS) category assigned to that thread. A QoS category can be assigned for a program, threads within a program, or groups of threads in a program. Rules can be defined for QoS categories to determine a suggested execution order for the threads. For example, the rules may suggest that a QoS user-initiated thread is executed before a QoS background thread.

A priority inversion can be when a lower priority thread is blocking the execution of a higher priority thread. Continuing the example from above, a priority inversion can occur if a QoS background thread is blocking, or preventing the execution of, a QoS user-initiated thread. A priority inversion can cause a hang, or freeze, where a program is unresponsive. A hang can be caused by other potential responsiveness issues including non-user interface (non-UI) work on the main thread. In some circumstances, the first thread that begins executing when the program starts can be the main thread but does not necessarily have to be. The main thread (e.g., target thread) may be reserved for user interface related threads that are particularly time sensitive. A user may be more likely to notice UI delays because the user interacts with the program through the UI. For instance, a 100 millisecond delay to a background process may go unnoticed but a similar delay in response to a UI input may degrade the user experience.

Thread related issues can be difficult to identify during development. These thread related issues, such as priority inversions, may increase the risk of a hang, but the issue may not occur under all circumstances or on all devices. Because of the difficulty in detecting thread related issues while writing code, developers may treat these issues as a production problem that can be fixed in a software update. However, hangs can degrade the customer experience and may hurt a customer's perception of the application, operating system, or device. Reducing hangs can improve the customer experience and potentially increase customer retention.

Flagging potential responsiveness issues that can cause a hang (e.g., user interface (UI) responsiveness) can help developers detect and resolve thread related issues during software development. The identified potential responsiveness issues can be provided to a developer as part of software, called an integrated development environment (IDE), that facilitates software development. An IDE can contain a source code editor, a debugger, and automations that help the developer write code. The debugger is a computer program within the IDE that can run a target program in a controlled environment. During debugging, the debugger can run the target program and identify potential responsiveness issues. The debugger can present an annotated version of the target program's source code via a graphical user interface (GUI). The source code can be annotated to identify the source code causing the potential responsiveness issues to help the developer identify problem areas in her code. The developer can optimize her code by rewriting the source code to address the problem areas identified by the debugger.

I. Potential Responsiveness Issues

Potential responsiveness issues can include priority inversions and non-user interface (non-UI) work on the main thread. A priority inversion can be when a thread with a higher priority waits while a lower priority thread is executed. Non-UI work on the main thread can be when work unrelated to the UI is included on the main thread.

A. Priority Inversions

Priority inversions can occur when a thread with a higher priority waits for a lower priority thread to finish executing. Threads can be scheduled for executing on a processor using a variable called a semaphore. A semaphore can be an abstract data type that can be used to control access to a shared resource. Without a semaphore, collisions can occur when two threads attempt to simultaneously execute on the same processor. A semaphore can have values restricted to one or zero (e.g., a binary semaphore counting) or the values can be restricted to natural numbers (e.g., a counting semaphore).

The semaphore's value can be equal to the number of resources managed by the semaphore. Functions can be called to increase or decrease the semaphore's value to reflect the available resources. A semaphore wait function can be called to request execution of a thread and to decrease the semaphore's value. A thread that has called the semaphore wait function can be a wait thread. A semaphore signal function can be called after execution is completed and the function can increase the semaphore's value to show an increase in available resources. A thread that has called the semaphore signal function can be a signaler thread. For instance, a processor can execute four threads at once, and a semaphore for the processor equals four when the processor is idle. A thread can request execution by calling the semaphore wait function. The thread can be executed, and the semaphore's value can be decreased to three, in response to the function call. When the thread finishes executing, the thread can call the semaphore signal function and the semaphore's value can be increased to four.

A thread may request execution while resources are unavailable (e.g., while the semaphore's value is zero). A thread can be added to a queue, or enqueued, if the thread calls the semaphore wait function while the resources managed by the semaphore are unavailable. When the resource becomes available, after a thread calls the semaphore signal function, the thread at the top of the queue can be executed.

FIG. 1 is a table 100 showing a priority inversion flagging policy according to an embodiment. A priority inversion can occur when a thread in the queue (e.g., wait queue) has a higher priority than a thread executing on the processor. Priority for threads, or programs, can be defined in a number of ways including using quality of service (QoS) categories. QoS categories can be categories that are related to the classification of the work. The QoS categories can define how threads are handled by a device so that latency sensitive threads are handled first. QoS categories can include, in order of priority with the highest priority first: (1) QoS user interactive, (2) QoS user initiated, (3) QoS default, (4) QoS utility, and (5) QoS background. In addition, threads that have not been assigned a QoS category can be designated as (6) QoS unspecified.

QoS categories can be assigned for a program, individual threads within a program, or groups of threads within a program. QoS user interactive tasks are the highest priority tasks and can include animations, event handling, or updates to an application's user interface. Tasks or queues that interact with the user or tasks and queues that actively update a user interface can be assigned QoS user interactive. For example, QoS user interactive can be assigned to animations or interactive event tracking. QoS user initiated can be assigned to tasks that provide results for a user interaction or for tasks that would prevent the user from using the software that need to be executed rapidly and complete quickly for a responsive experience. For example, user interactive can be assigned to a request to load content that a user has selected. QoS background can be assigned to tasks that occur while the software is running in the background. QoS utility can be assigned to tasks that, if interrupted, do not prevent a user from using the software. For example, QoS utility can be assigned to long-running tasks whose progress the user does not follow actively. QoS default can be a default QoS class and QoS unspecified is for tasks that have not been assigned a QoS category.

The policies in table 100 can be used to determine whether an inversion has been identified in written code and the appropriate response to the identified inversion. The waiter thread, shown on the far-left column can be a thread that calls the semaphore wait function to request execution of the thread. If a resource managed by the semaphore is available (e.g., the semaphore value is a positive integer), the waiter thread can begin to execute after calling the wait function. However, if no resource is available (e.g., the semaphore value is less than 1), the waiter thread can be added to a wait queue. If waiter threads are in the wait queue, the semaphore may have a negative value. The signaler thread, on the top column, can be a thread that calls the semaphore signal function after execution of the thread has completed. Calling the semaphore signal function can increase the semaphore value to indicate that a resource managed by the semaphore is available for a waiter thread.

A priority inversion can occur when lower priority signaler thread calls the semaphore signal function while a higher priority waiter function awaits execution. No inversion 102 can indicate that there is no priority inversion because the QoS of the waiter thread 104 is less than or equal to the QoS of the signal thread 106. In this case, signaler thread 106, with the QoS category: QoS user initiated, has the same QoS as the waiter thread 104. Inversion called out 108 can indicate that there is a priority inversion because the QoS of the waiter thread 104 (e.g., QoS user initiated) is higher than the QoS of the signaler thread 110 (e.g., QoS utility).

Priority inversions may be flagged in software because the delay caused by the inversion would be noticed by the software's user. For example, inversion called out 112 can be flagged because a user might notice that a signaler thread 114 categorized as QoS background has finished executing (e.g., called the signal function) while a waiter thread 104 categorized as QoS user initiated is pending in the wait queue. However, not all priority inversions are flagged. For example, a user may not notice whether a signaler thread 106 classified as "QoS user initiated" executes before a waiter thread 116 categorized as "QoS user interactive." Accordingly, inversion but suppressed 118 can indicate that an inversion occurred, but both threads are high priority, and a user would not notice if the order of execution was changed. In addition, a signaler thread with an unspecified QoS category, such as signaler thread 120, that executes before high priority waiter thread, such as waiter thread 104, may have the inversion called out 122. However, the potential inversion may be ignored 124 if signaler thread 120 executes before a low priority thread such as waiter thread 126.

Figure 3:
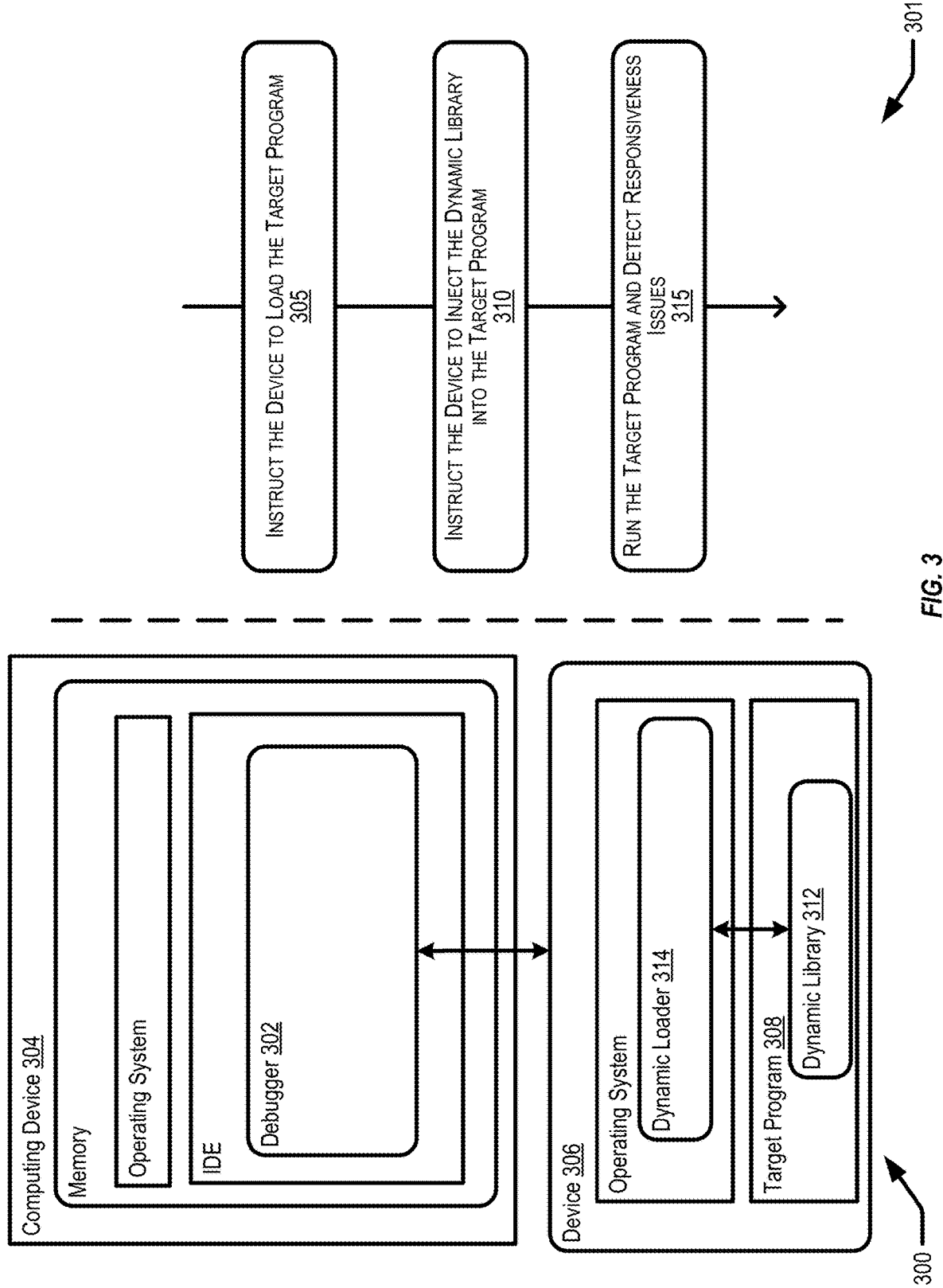
FIG. 3 shows a diagram and method for identifying potential responsiveness issues using multiple computing devices according to an embodiment.
Figure 4:
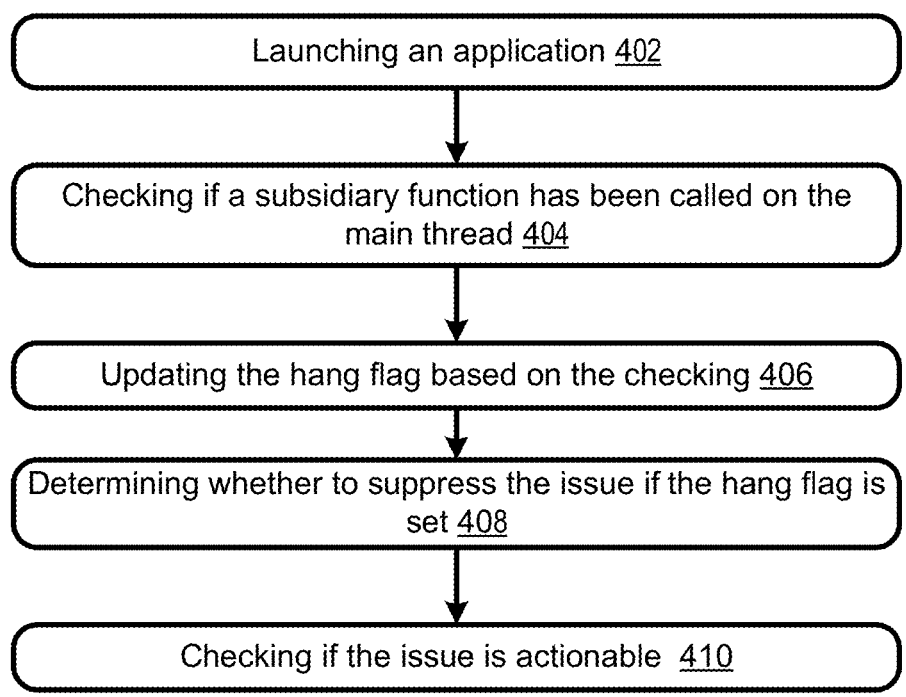
FIG. 4 shows a simplified method for detecting a potential responsiveness issue according to an embodiment.
Figure 6:
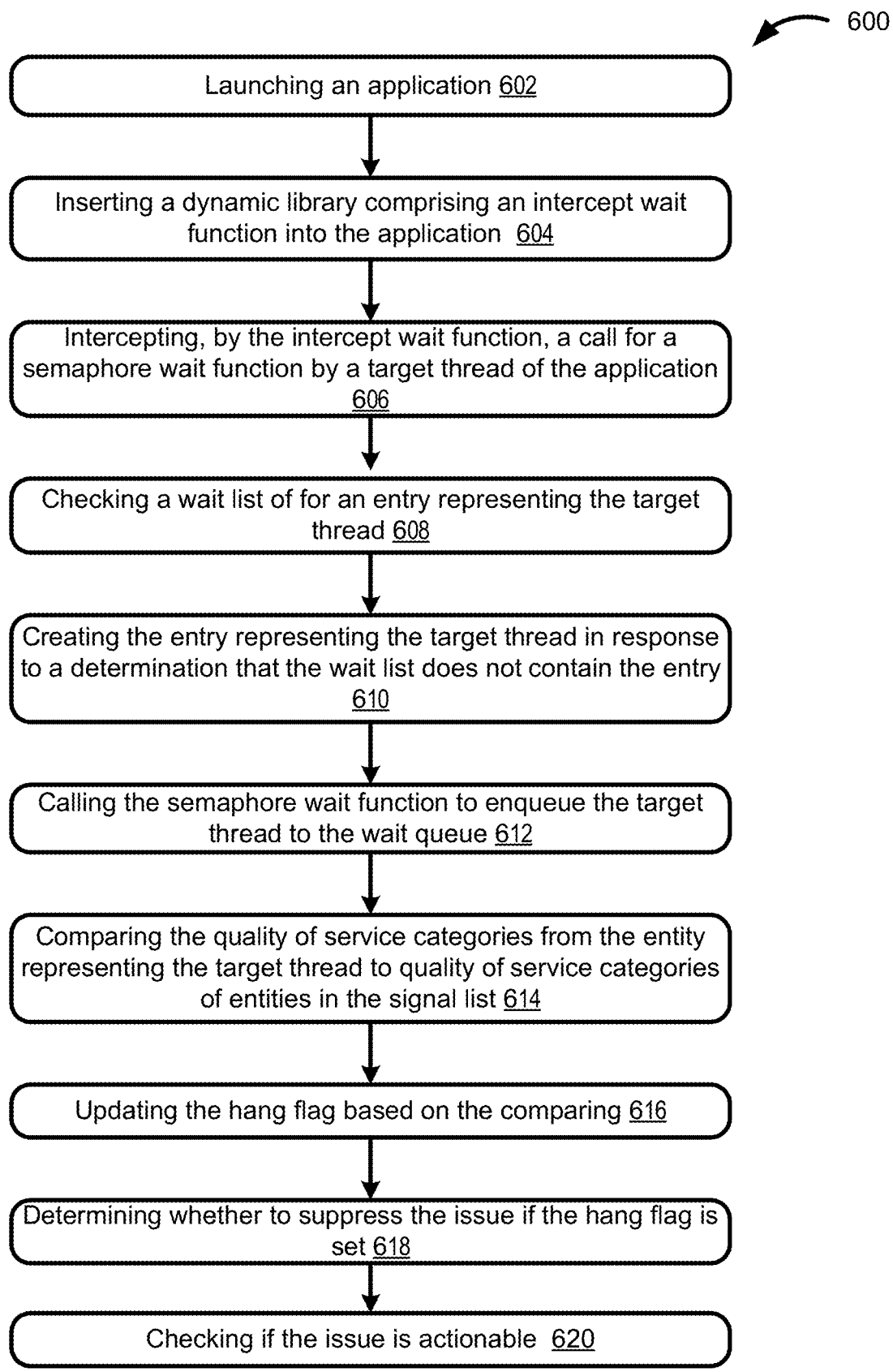
FIG. 6 shows a method for identifying potential responsiveness issues according to an embodiment.

FIG. 2 shows a diagram 200 and method 201 for identifying potential responsiveness issues using a single computing device 214 according to an embodiment. This method, and the methods from FIGS. 3, 4, and 6, is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The orders in which the operations are described are not intended to be construed as a limitation, and any number of the described operations can be combined in any order and/or in parallel to implement the processes or the method.

Turning to method 201 in greater detail, at block 205, an application can be loaded in a debugger on computing device 214. Computing device 214 can be a computing device that a developer is using to write code in an IDE 206. While writing, the developer may wish to identify potential responsiveness issues with the code. The debugger 202 can be an application that is used to test and debug a target program (e.g., application) 204. Debugger 202 can test target program 204 while the program is running in a simulated environment. The simulated environment can be within debugger 202 or managed by the debugger. Debugger 202 can be part of an integrated development environment (IDE) 206 that can be used to develop software such as target program 204.

At block 210, a dynamic library can be loaded into the target program. The dynamic library 208 can be loaded into target program 204 by dynamic loader 212. Dynamic library 208 can be loaded into target program 204 by adding dynamic library 208 to address space allocated for target program 204. Function interception can be achieved through interposition of C functions (e.g., replacing calls to functions) or swizzling (e.g., replacing the implementation of a method at runtime) for objective-C methods.

At block 215, the target program can be run. Dynamic library 208 can contain functions that can identify potential responsiveness issues while target program 204 is running. The functions to identify potential responsiveness issues can include an intercept wait function that can intercept calls to the semaphore wait function or an intercept signal function that can intercept calls to the semaphore signal function. When a thread calls the semaphore wait function, the call can be intercepted by the intercept wait function and an entry can be made in a wait list. When a thread calls the semaphore signal function, the call can be intercepted by the intercept signal function and an entry can be made in a signal list.

Entries in the wait list and the signal list can be cross referenced to determine if an entry in the signal list has a lower QoS category than an entry in the signal list. A thread associated with the entry in the signal list can be flagged as a potential responsiveness issue if the entry has a lower QoS category than an entry in the wait list. The thread can determine its QoS category using an application programming interface (API). The thread can call the API and a QoS category for the thread can be returned.

FIG. 3 shows a diagram 300 and method 301 for identifying potential responsiveness issues using multiple computing devices (e.g., computing device 304 and device 306) according to an embodiment. A debugger within an IDE on computing device 304 can be used by a developer to test target software that is running on a separate device. The computing device 304 that a developer is using to write software may be different than the device that the developer intends to use with the software, and running the software on a device allows for debugging of the target software with different hardware configurations. For example, computing device 304 can be a laptop computer and device 306 can be a smartphone, and debugging on the laptop computer may not be sufficient to identify responsiveness issues that the software would face when executing on the smartphone.

Turning to method 301 in greater detail, at block 305, The device can be instructed to load the target program. The debugger 302, in computing device 304, can instruct the device 306 to load the target program 308. Target program 308 can be running on device 306. Computing device 304 or device 306 can be any suitable computing device such as a laptop computer, a tablet computer, a server computer, an electronic device (e.g., electronic device 900), etc.

At block 310, the device can be instructed to inject the dynamic library into the target program. Debugger 302 can instruct device 306 to inject the dynamic library 312 into the target program 308. Device 306 can use dynamic loader 314 to inject dynamic library 312 into target program 308. Dynamic library 312 can be loaded into target program 308 by loading dynamic library 312 into address space allocated for target program 308.

At block 315, the target program can be run. Dynamic library 312 can contain functions that can identify potential responsiveness issues while target program 308 is running. The functions to identify potential responsiveness issues can include an intercept wait function that can intercept calls to the semaphore wait function or an intercept signal function that can intercept calls to the semaphore signal function. When a thread calls the semaphore wait function, the call can be intercepted by the intercept wait function and an entry can be made in a wait list. When a thread calls the semaphore signal function, the call can be intercepted by the intercept signal function and an entry can be made in a signal list. Entries in the wait list and the signal list can be cross referenced to determine if an entry in the signal list has a lower QoS category than an entry in the signal list. A thread associated with the entry in the signal list can be flagged as a potential responsiveness issue if the entry has a lower QoS category than an entry in the wait list.

B. Other Potential Responsiveness Issues

Potential responsiveness issues can also include instances when non-user interface (non-UI) functions or synchronous networking functions execute on a main thread. Such functions that may cause responsiveness issues if the functions are executed on the main thread can be called subsidiary functions.

FIG. 4 shows a simplified method 400 for detecting a potential responsiveness issue according to an embodiment. The main thread can be the thread that executes first or a thread that is reserved for high priority processes. Subsidiary functions can include functions that should not execute on the main thread such as non-UI work functions, synchronous networking functions, intercept Input/Output functions, file access functions, JSON deserialization, or XML parsing.

Turning to method 400 in greater detail, at block 402, an application can be launched. The application (e.g., target program 204, target program 308, third party application 702, third party application 802, applications 934, etc.) can be launched in a debugger (e.g., debugger 202, debugger 302, etc.). The debugger can instruct an electronic device (e.g., computing device 304, device 306, devices 704, devices 804, electronic device 900, etc.) to launch the application. The debugger may communicate with the electronic device via one or more networks and using a communications module (e.g., communications module 924, etc.) or wireless circuitry (e.g., wireless circuitry 908, etc.) of a device running the debugger and the device launching the application.

At block 404, the main thread can be checked to determine if a subsidiary function has been called on a main thread. Subsidiary functions can include non-UI work functions, synchronous networking functions, intercept Input/Output functions, file access functions, JSON deserialization, or XML parsing. Synchronous networking (e.g., synchronous transmissions) can be when a network request blocks the execution of code. In addition, potential responsiveness issues can include instances where Input/Output (I/O) processes are executed on the main thread. For instance, a responsiveness issue may be identified if the debugger detects that a camera was initialized on the main thread.

In addition, responsiveness issues can be identified if file access is performed on the main thread. For example, file access can be performed on the main thread if a file is read from or written to on the main thread. Also, potential responsiveness issues can happen if JSON deserialization or XML parsing occurs on the main thread. Detecting non-UI work on the main thread does not necessitate intercepting functions and some methods can be intercepted in the dynamic library. In some methods, no interception is performed, and the detection is done inside the method itself.

At block 406, the hang flag can be updated based on the checking. The hang flag can indicate whether a potential responsiveness issue (e.g., potential performance issue) was detected (e.g., identified). The hang flag can be updated if a subsidiary function was determined to have been called on the main thread. The hang flag can be updated and stored by the intercept wait function, the intercept semaphore function, the debugger or a function from the dynamic library. Updating the hang flag can include providing a notification identifying the target thread to a user.

At block 408, whether to suppress the hang flag can be determined. A suppression file can be checked to determine whether to suppress the hang flag, and the suppression file can comprise a list of methods and classes corresponding to issues that should be suppressed. The suppression file is discussed in greater detail in section I.C below.

At block 410, whether the hang flag is actionable can be checked. Determining whether the frame is actionable can include checking a backtrace. A hang flag can be actionable if the backtrace frame corresponding to the hang flag has a symbol and if the frame is at least two frames higher than the last frame in the backtrace. Backtraces are discussed in greater detail in section I.C below.

C. Example IDE

Figure 5:
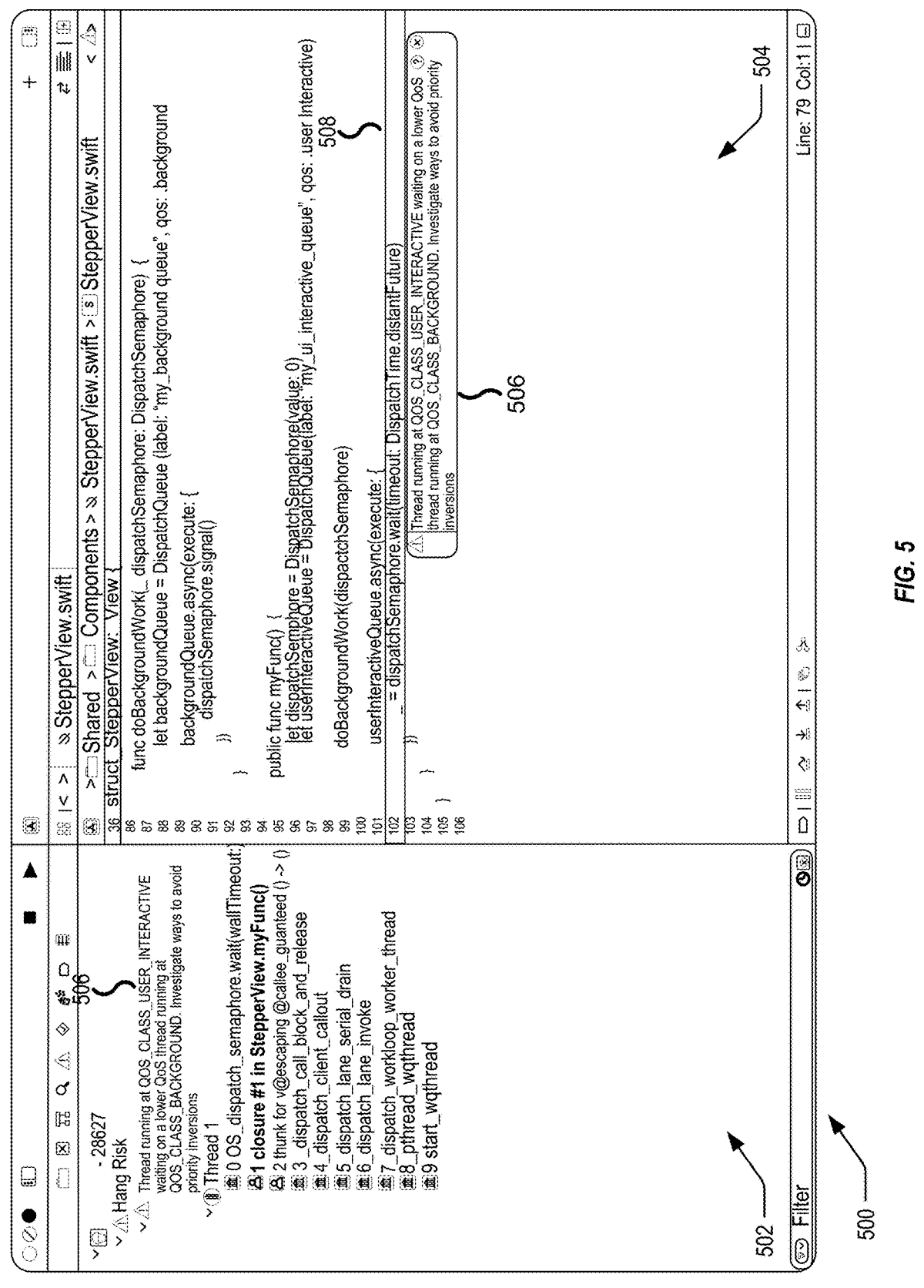

FIG. 5 shows a User Interface (UI) 500 of an example integrated development environment (IDE) according to an embodiment. The IDE can be implemented as software that facilitates software development, and an IDE can include a source code editor, a debugger, and automated tools. The display 500 can include a debugger graphical user interface (GUI) 502 and a source code editor GUI 504. Source code can be displayed and edited on the source code editor GUI 504. The debugger GUI 502 can show potential responsiveness issues in banner 506 that were detected for individual threads. The detected potential responsiveness issues shown in banner 506 can be shown in the source code editor GUI 504 and the code 508 causing the metric can be highlighted to help the developer identify the code causing the identified metric. In some embodiments, the potential responsiveness issues can be surfaced in a continuous integration environment.

In order to ensure issues surfaced to the user are actionable, there are two mechanisms in place to determine actionability. First, the IDE can check whether the issue will be surfaced in a location in the source editor for which symbols are available. A symbol can be information about a particular function including one or more of a name, a filename, a line number, or an address for the function. This analysis can be done inside the IDE after the dynamic library has generated the issue but before the IDE surfaces the issue to the user. A backtrace can be a summary of a software program's activities with an ordered set of contiguous frames representing data associated with each function called by the software. The frames can be ordered with the first frame in the ordered set of continuous frames representing the first function that was called, and the last frame can contain data for the last function that was called. The backtrace can be analyzed by the IDE, and an issue can be surfaced if the frame corresponding to the issue will be surfaced meets two conditions: i) The frame has symbols, and ii) The frame is at least 2 frames above the bottom most frame in the backtrace (e.g., the last frame in the backtrace).

Second there may be situations where the user does not want to see a flagged issue (e.g., the user suppresses the flagged issue because the user finds an issue detected by the dynamic library too hard to fix). The dynamic library can expose an environment variable to specify a suppression file. The user can place the suppression file inside the bundle. The user can provide a list of methods and classes in the file to instruct the dynamic library to suppress issues containing those methods or classes in the backtrace.

To achieve this, the dynamic library can parse the suppression file during initialization. Whenever an issue is detected, the dynamic library can analyze the backtrace to look for methods and classes from the suppression file, and if the dynamic library ever finds an issue that matches the methods or classes in the suppression file, such an issue is not surfaced to the user. In addition, the banner 506 shown in the source editor in the IDE when an issue is surfaced can have a hyperlink to documentation that explains various resolution strategies.

II. Method Flow

FIG. 6 shows a method 600 *t*. At block 602, an application can be launched. The application (e.g., target program 204, target program 308, third party application 702, third party application 802, applications 934, etc.) can be launched in a debugger (e.g., debugger 202, debugger 302, etc.). The debugger can instruct an electronic device (e.g., computing device 304, device 306, devices 704, devices 804, electronic device 900, etc.) to launch the application. The debugger may communicate with the electronic device via one or more networks and using a communications module (e.g., communications module 924, etc.) or wireless circuitry (e.g., wireless circuitry 908, etc.) of a device running the debugger and the device launching the application.

At block 604, a dynamic library can be inserted into the application. The dynamic library can comprise an intercept wait function. The dynamic library (e.g., dynamic library 208, dynamic library 312, etc.) can be inserted into the application by storing the dynamic library in the address space used by the application. The dynamic library can be inserted by dynamic loader (e.g., dynamic loader 212, dynamic loader 314, etc.) in response to an instruction from the debugger.

At block 606, a call for a semaphore wait function can be intercepted by the intercept wait function. The call can be made by a target thread of the application. A message for the semaphore wait function can be intercepted by the intercept wait function from the dynamic library. The semaphore wait function can comprise a request to enqueue the target thread to a wait queue.

At block 608, a wait list can be checked for an entry representing the target thread. The wait list can be a wait list of a table that stores one or more entries in the wait list or the signal list. An entry in the table can comprise one or more of a quality-of-service category or a hang flag for the thread. The quality-of-service categories can include one or more of: (1) a user interactive category (QoS user interactive), (2) a user initiated category (QoS user initiated), (3) a default category (QoS default), (4) a utility category (QoS utility), (5) a background category (QoS background), or an unspecified category (QoS unspecified).

At block 610, an entry in the wait list representing the target thread can be created in response to a determination that the wait list does not contain the first entry. The wait list can be created and maintained by the intercept wait function or a function from the dynamic library.

At block 612, the semaphore wait function can be called to enqueue the target thread to the wait queue. The intercept wait function can call the semaphore wait function, and the thread may block in the semaphore wait function until a pending signal is received from a semaphore signal function by a thread. The intercept wait function can call the semaphore wait function when the entity representing the thread is next in line in the wait list.

At block 614, the quality-of-service category from the entity representing the target thread can be compared to the quality of service categories of the entities in the signal list. The intercept wait function, the intercept semaphore function, the debugger, or a function from the dynamic library can compare the quality-of-service categories. The intercept wait function, the intercept semaphore function, the debugger or a function from the dynamic library can create and maintain the signal list. The quality of service category from the entry representing the target thread can be compared when the target thread is next in the wait queue (e.g., the last entry in the wait queue).

At block 616, the hang flag can be updated based on the comparing. The hang flag can indicate whether a potential responsiveness issue (e.g., potential performance issue) was detected (e.g., identified). The hang flag can be updated if the quality of service category for the entity representing the target thread is a higher priority category than a quality of service category for an entry in the signal list. The hang flag can be updated and stored by the intercept wait function, the intercept semaphore function, the debugger or a function from the dynamic library. The hang flag can be updated in accordance with the quality-of-service category for the entry representing the target thread being the user interactive category (QoS user interactive) or the user initiated category (QoS user initiated) and an entry quality of service category for an entry in the signal list being a background category (QoS background), a utility category (QoS utility), a default category (QoS default), or an unspecified category (QoS unspecified). Updating the hang flag can include providing a notification identifying the target thread to a user.

At block 618, whether to suppress the issue if the hang flag is set can be determined. A suppression file can be checked to determine whether to suppress the issue, and the suppression file can comprise a list of methods and classes corresponding to issues that should be suppressed.

At block 620, whether the issue is actionable can be checked. Determining whether the frame is actionable can include checking a backtrace. An issue can be actionable if the backtrace frame corresponding to the hang flag has a symbol and if the frame is at least two frames higher than the last frame in the backtrace.

III. Data Ingestion and Processing System

The techniques disclosed herein can include a process for data ingestion and processing of thread data that can be used to identify potential responsiveness issues. The thread data that can be used to identify potential responsiveness issues can be captured from the device kernel, a logging routine (e.g., Powerlog) of the operating system (e.g., iOS), and a hardware logging routine (e.g., Signpost).

Figure 7:
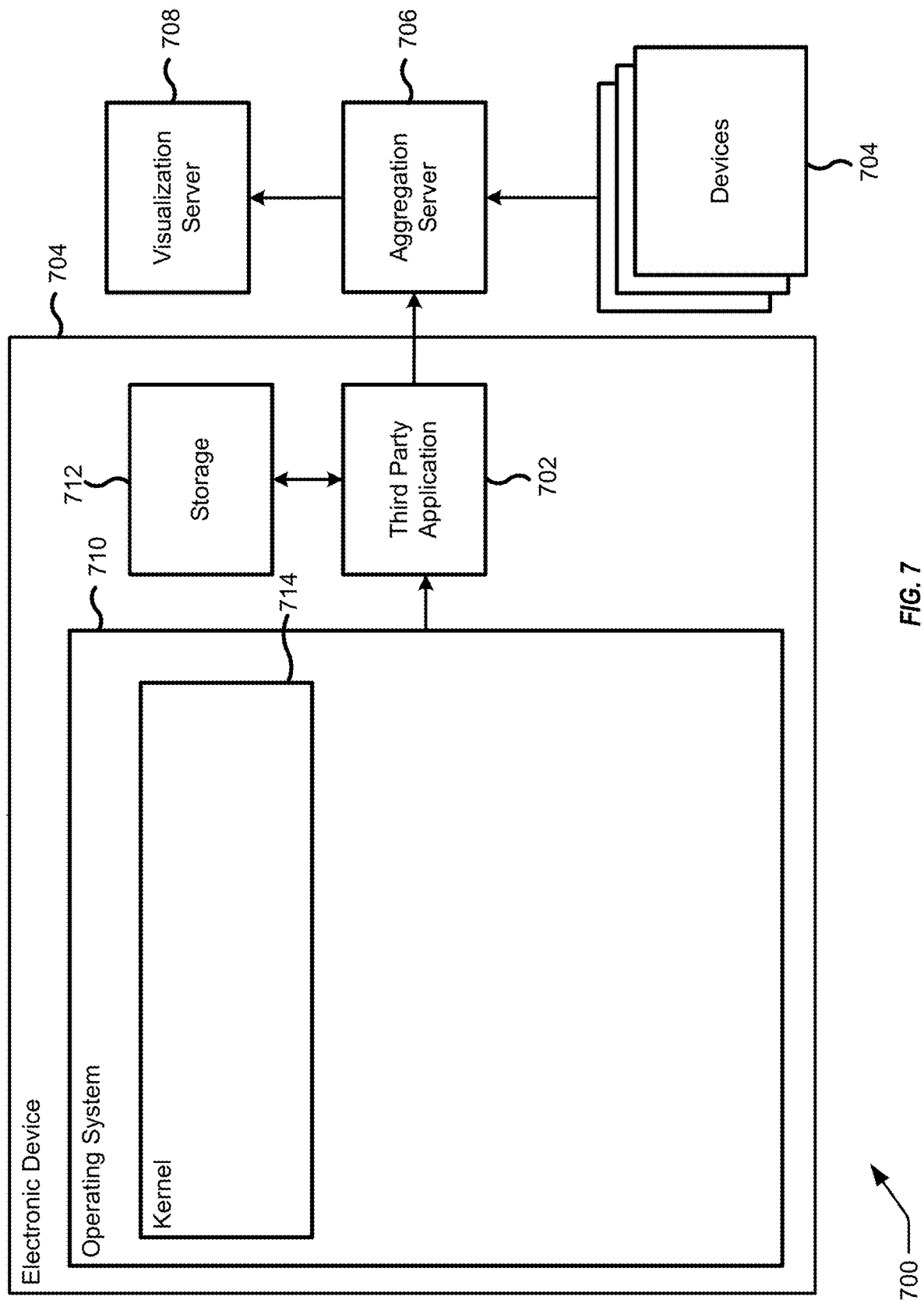
FIG. 7 illustrates a simplified, example diagram of a system for collecting, aggregating, and visualizing operational metrics for evaluating third party applications.

FIG. 7 illustrates a simplified, example diagram of a system 700 for collecting, aggregating, and visualizing operational metrics for evaluating third party applications 702. The operational metrics can include potential responsiveness issues. A third-party application 702 is a program (e.g., an application or App) created by a developer that is different from the manufacturer of the electronic device that the application runs on or the owner of the website that offers it. The third-party application 702 can be loaded into a memory of the device and be executed on one or more processors of the device. A third-party application 702 can present information to a user on a display of the electronic device 704.

The system 700 can include one or more electronic devices 704, an aggregation server 706 and a visualization server 708. The electronic devices 704 can include, but are not limited to, a smartphone, a tablet, a portable computer, or a wearable device. The electronic devices 704 can include various classification as well as different models of devices. The electronic device 704 can execute an operating system 710 to execute one or more instructions from a plurality of code stored in a memory 712 on the electronic device 704. An operating system (OS) 710 is a system software that manages hardware and software resources and provides common services for programs (e.g., applications). A kernel 714 is the central part of an operating system 710. The kernel 714 manages the operations of the electronic device 704 and the hardware, most notably memory and central processing unit (CPU) time. The aggregation server 706 can collect potential responsiveness issue data for a plurality of different electronic devices 704 and for calculation of various different potential responsiveness issues including priority inversions, synchronous networking, non-UI work on the main thread, etc. The visualization server 708 receives aggregated operational metric data in order to display the potential responsiveness issues for evaluation of the performance of third-party application 702.

Figure 8:
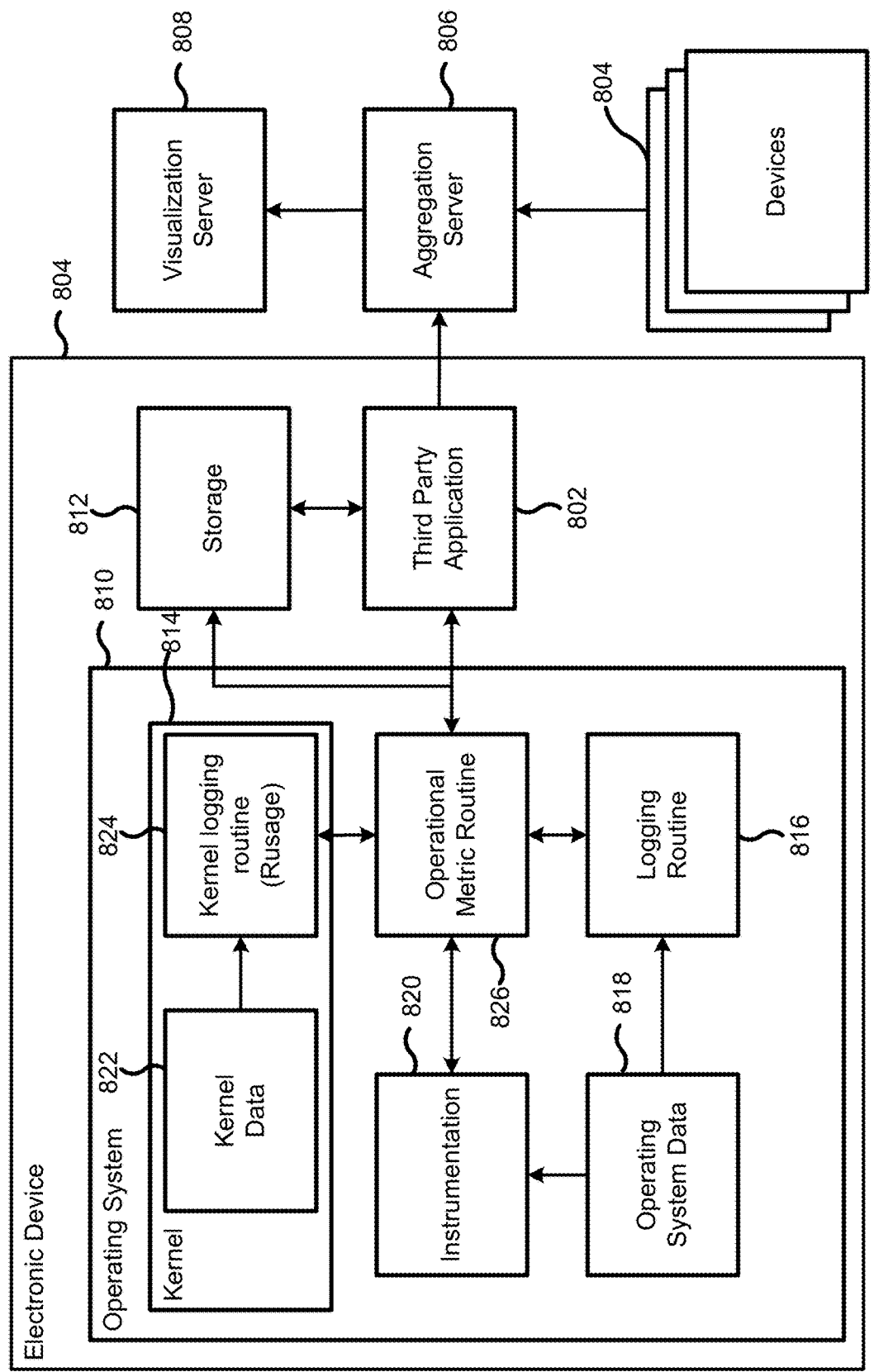
FIG. 8 illustrates an example diagram of a system for collecting, aggregating, and visualizing operational metrics for evaluating third party applications.

FIG. 8 provides additional details for the system 700 described in FIG. 7. The third-party application 802 can transmit an identifier to the operating system 810. The identifier can cause the operational metric routine 826 to execute a process to collect a plurality of metric records. Metrics or metric records can be used to identify potential responsiveness issues. In some embodiments, the identifier can inform the operational metric routine 826 the types of metrics that the developer desired to collect or the types of responsiveness issues that the developer desires to identify. In some embodiments, a developer can register the application 802 with the operating system developer. The application registration process can provide information on the application 802 and can inform the operational metric routine 826 of the specific operational metrics that the developer is interested in measuring.

The operating system 810 of the electronic device 804 can include various logging routines 816. In various embodiments, the logging routines can continuously capture data generated by the operating system of the device and save the data in a persistent storage (e.g., a memory). The logging routine 816 can capture operating system data 818 (e.g., foreground time, background time, networking bytes (per application), and location activity). The logging routine 816 can collect the operational data 818 and provide it to operational metric routine 826.

The logging routine 816 can collect metrics on CPU time, GPU time, CPU instructions, display average pixel luminance, cellular networking conditions, number of logical writes, and memory usage. The logging routine 816 captures snapshots for these metrics for all processes and applications running on the operating system 810 from different data sources at significant battery change (SBC) events. These events occur when there is a change in the electronic devices' battery level during the course of normal usage of the device. The logging routine 816 is configurable to allow for additional snapshotting at other important system level events. In some embodiments, once a day, the logging routine 816 summarizes these metrics per application from the previous 24 hours period (midnight to midnight) and delivers the payload to the operational metric routine 826 over a cross-process communication platform (e.g., XPC). Upon receiving this data, the operational metric routine 826 saves this data to its local persistent storage 812.

In the kernel 814, a plurality of kernel data 822 can be generated. The kernel data 822 can include CPU/graphics processing unit (GPU) time, number of logical writes to a solid-state device (SSD), and memory usage. A kernel logging routine 824 can collect the kernel data 822 and provide it to the operational metric routine 826. The operational metric routine can save the kernel data in the storage 812.

As detailed earlier, the data from different sources on the operating system 810 including the kernel logging routine 824 is snapshotted by the logging routine 816 and delivered to the operational logging routine 816 once/day over a cross-process communication platform (e.g., XPC). The kernel logging routine 824 maintains various cumulative counters per process (e.g., CPU time, GPU time, CPU instructions etc.) which are continuously updated in memory during the execution of these processes.

The operating system 810 can also include instrumentation 820. The instrumentation 820 allows for selective capture of one or more operational metrics surrounding a particular event, during a discrete time period, or during execution of a particular feature of an application 802. The instrumentation 820 can log system level data (e.g., launch and resume times. Hang durations, frame rates). In addition, the instrumentation 820 can be used to set regional markers to evaluate features of the applications 802. The operating system (OS) regional markers can be used to evaluate CPU time, number of CPU instructions, current and peak memory, and logical writes. Instrumentation 820 can be used to identify potential responsiveness issues including priority inversions or non-UI work on the main thread.

Custom logging routine markers (e.g., MXSignposts) are built on top of operating system routine region markers (e.g., os_signpost). Custom logging routines provide a snapshot a subset of metrics for its process from the kernel logging routine 824 and store this data in the metadata field of the operational regional markers. Custom logging routines allow developers to mark critical sections of their code and collect power and performance metrics for those marked sections.

For the system level signpost data, developers internally instrument different parts of the system. For example launch times are measured by instrumenting the device operating system manager for handling foreground tasks (e.g., Frontboard) with operating system markers (e.g., os_signposts). Custom logging routine markers (e.g., MXSignposts) are distinguished by the system from the other operating system markers (e.g., os_signposts) by using the subsystem field value of os_signposts. Custom logging routine markers are tagged internally with a subsystem value unique to the customer logging routine markers.

The third-party application 802 can collect the metric record data (collected from the operational metric routine 826) and save the metric record data to storage 812. In addition, the third-party application can transmit the metric record data outside the electronic device 804. The metric record data can be transferred over a network (e.g., the internet). The metric record data can be aggregated with metric data from other devices in the aggregation server 806. The metric record data can be used to identify potential responsiveness issues. The aggregation server 806 can decode the metric record data. A plurality of metadata accompanies the metric record data. The plurality of metadata can identify the classification of model of the device 804 from which the data originated. The aggregation server 806 can save the data to a data structure based on the value of the operation metric. The aggregation server 806 can allow for efficient analysis of the operational metrics.

The visualization server 808 receives aggregated operational metric data or identified potential responsiveness issues in order to display the data for evaluation of the performance of third-party application 802.

IV. Example Devices

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 9:
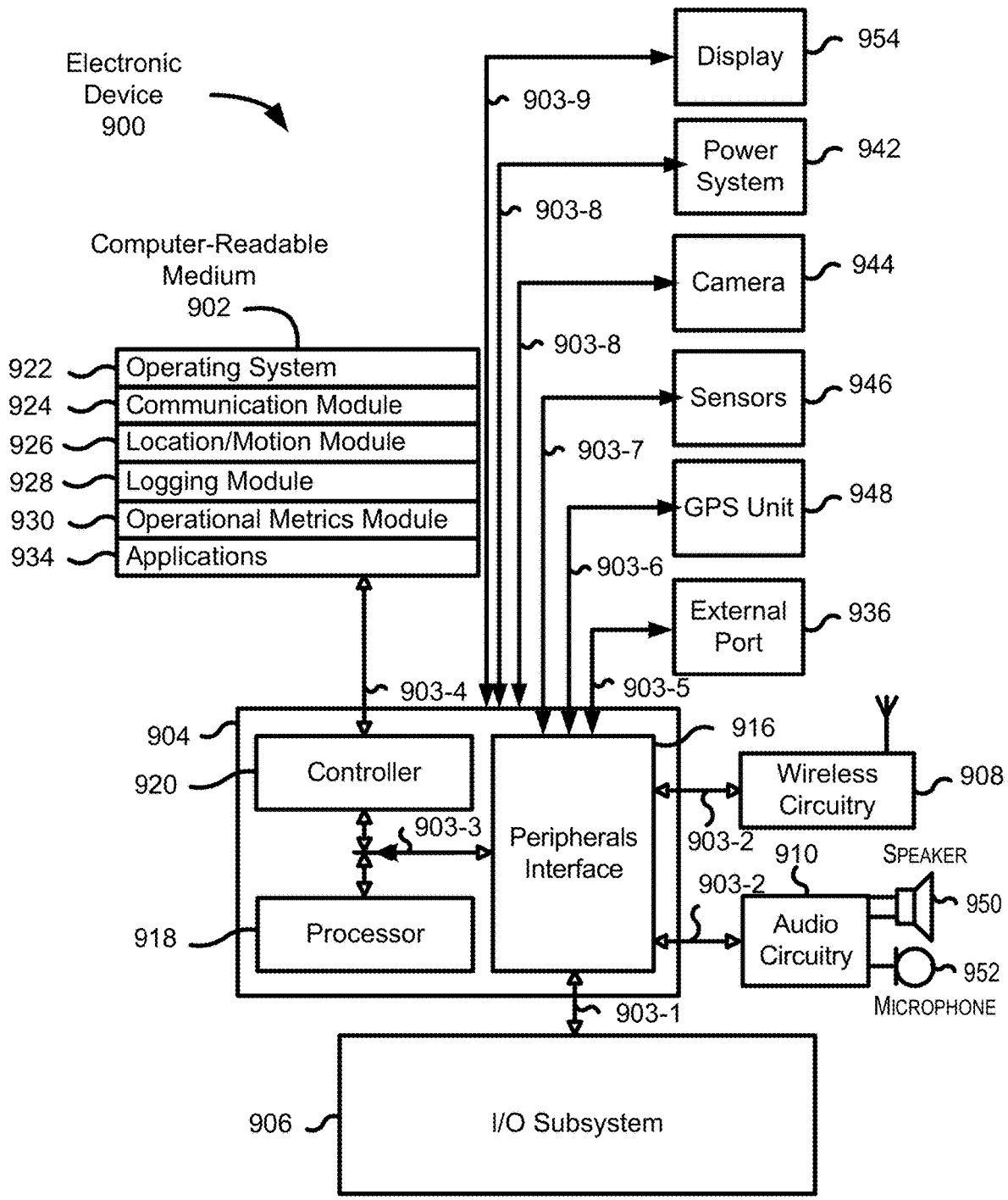
FIG. 9 illustrates a block diagram for an example device to perform the one or more techniques described herein.

FIG. 9 is a block diagram of an example device 900, which may be a mobile device upon which the techniques can be performed. Device 900 generally includes computer-readable medium (memory) 902, a processing system 904, an Input/Output (I/O) subsystem 906, wireless circuitry 908, and audio circuitry 910 including speaker 950 and microphone 952. These components may be coupled by one or more communication buses or signal lines 903. Device 900 can be any portable electronic device, including a handheld computer, a tablet computer, a mobile phone, laptop computer, tablet device, media player, a wearable device, personal digital assistant (PDA), a key fob, a car key, an access card, a multifunction device, a mobile phone, a portable gaming device, a car display unit, or the like, including a combination of two or more of these items.

The device 900 can be a multifunction device having a display 954. The display 954 can be a touch screen in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 900. In some implementations or circumstances, inadvertent contact with a graphic does not select the graphic. For example, a swipe gesture that sweeps over an application icon optionally does not select the corresponding application when the gesture corresponding to selection is a tap. Device 900 can optionally also include one or more physical buttons, such as "home" or menu button. As menu button is, optionally, used to navigate to any application in a set of applications that are, optionally executed on the device 900. Alternatively, in some embodiments, the menu button is implemented as a soft key in a graphical user interface displayed on touch screen.

The device 900 can incorporate a display 954. The display 954 can be a liquid crystal display (LCD), organic light emitting diode (OLED), active matrix organic light emitting diode (AMOLED), Super active matrix light emitting diode (AMOLED), thin-film transistor (TFT), in-plane switching (IPS), or thin-film transistor liquid crystal display (TFT-LCD) that typically can be found a computing device. The display 954 may be a touch screen display of a computing device.

In one embodiment, device 900 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 900 also accepts verbal input for activation or deactivation of some functions through microphone. Device 900 also, optionally, includes one or more contact intensity sensors for detecting intensity of contacts on touch screen and/or one or more tactile output generators for generating tactile outputs for a user of device 900.

In one illustrative configuration, device 900 may include at least one computer-readable medium (memory) 902 and one or more processing units (or processor(s)) 918. Processor(s) 918 may be implemented as appropriate in hardware, software, or combinations thereof. Computer-executable instruction or firmware implementations of processor(s) 918 may include computer-executable instructions written in any suitable programming language to perform the various functions described.

Computer-readable medium (memory) 902 may store program instructions that are loadable and executable on processor(s) 918, as well as data generated during the execution of these programs. Depending on the configuration and type of device 900, memory 902 may be volatile (such as random access memory (RAM)) and/or non-volatile (such as read-only memory (ROM), flash memory, etc.). Device 900 can have one or more memories. Device 900 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 902 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 902 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 902 and additional storage are both examples of non-transitory computer storage media. Additional types of computer storage media that may be present in device 900 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 900. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Device 900 may also contain communications connection(s) 908 that allow device 900 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 900 may also include I/O device(s) 906, such as a touch input device, a keyboard, a mouse, a pen, a voice input device, a display, a speaker, a printer, etc.

It should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a codec chipset, memory, etc. Wireless circuitry 908 can use various protocols, e.g., as described herein. For example, wireless circuitry 908 can have one component for one wireless protocol (e.g., Bluetooth®) and a separate component for another wireless protocol (e.g., ultra-wide band ((UWB). Different antennas can be used for the different protocols.

Wireless circuitry 908 is coupled to processing system 904 via peripherals interface 916. Interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on computer-readable medium (memory) 902.

Peripherals interface 916 couple the input and output peripherals of the device to processor(s) 918 and computer-readable medium 902. One or more processors 918 communicate with computer-readable medium 902 via a controller 920. Computer-readable medium 902 can be any device or medium that can store code and/or data for use by one or more processors 918. Medium 902 can include a memory hierarchy, including cache, main memory and secondary memory.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors 946 can include accelerometers, compasses, gyrometers, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module (or set of instructions) 924, a location module (or set of instructions) 926, a logging module 928, an operational metrics module 930, and other applications (or set of instructions) 934.

Operating system 922 can be any suitable operating system, including iOS, Macintosh Operating System (Mac OS), Darwin, Quadros Real-Time Operating System (RTXC), LINUX, UNIX, OS X, Microsoft Windows, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 922 is system software that manages computer hardware and software resources and provides common services for computer programs. For example, the operating system 922 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local-area network (LAN), etc.).

Location/motion module 926 can assist in determining the current position (e.g., coordinates or other geographic location identifiers) and motion of device 900. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data.

The electronic device can include a logging module 928. The logging module 928 once activated can receive and store event data that occurs on the electronic device. The event data can include but is not limited to central processing unit (CPU) time, graphics processing unit (GPU) time, memory information, launch time, hang time, average picture luminance (APL), frame rate, logical writes to a solid state device.

The electronic device can also include an operational metrics module 930. The operational metrics module 930 can receive the event data from the logging module and convert the event data into operational metrics. The metrics can include metadata indicating the operating system 922 version number for the electronic device 900, the class for the device 900 and the model number for the device 900.

The one or more applications programs 934 on the mobile device can include any applications installed on the device 900, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or advanced audio coding (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 906 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or track pad. In some embodiments, I/O subsystem 906 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as transmission control protocol/internet protocol (TCP/IP), open systems interconnection model (OSI), file transfer protocol (FTP), universal plug and play (UPnP), network file system (NFS), common internet file system (CIFS), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HyperText Transfer Protocol (HTTP) servers, file transfer protocol (FTP) servers, common gateway interface (CGI) servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present disclosure may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used display information regarding operation metrics for third party application. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of third party application evaluation techniques, the present technology can be configured to allow users to select to "opt in" or "opt out" of participation in the collection of personal information data during registration for services or anytime thereafter. In another example, users can select not to provide personal information to be displayed. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the third party application evaluation techniques, or publicly available information.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   intercepting, by a computing device executing an application and using an intercept function for the application, a call for a target thread of the application that indicates that there are insufficient resources allocated to execute the target thread;
   determining, by the computing device, whether a first quality of service for the target thread is higher than a second quality of service for another thread from one or more threads, each thread in the one or more threads having sufficient resources allocated to execute the corresponding thread; and
   updating, by the computing device, hang data for the target thread that indicates a potential responsiveness issue for the target thread based at least in part on determining that the first quality of service for the target thread is higher than the second quality of service for the other thread.

2. The method of claim 1, wherein:
   intercepting the call comprises intercepting the call that comprises a request to enqueue the target thread to a wait queue, the method comprising:
   detecting that the target thread is next in the wait queue, wherein:
   determining whether the first quality of service for the target thread is higher than the second quality of service for the other thread is responsive to detecting that the target thread is next in the wait queue.

3. The method of claim 1, comprising:
   providing, by the computing device and for presentation, a notification identifying the target thread.

4. The method of claim 1, wherein the other thread comprises a main thread for the application, the method comprising determining the second quality of service for the main thread that indicates that the main thread performs one or more operations for a synchronous transmission or an input/output (I/O) operation.

5. The method of claim 1, comprising:
   providing, by the computing device and to another device, a frame for the call for the target thread that indicates that there are insufficient resources allocated to execute the target thread to cause the other device to determine whether the frame is actionable, and, in response to determining that the frame is actionable, cause presentation in an interface about information for the frame.

6. The method of claim 1, comprising:
   determining, by the computing device, the first quality of service for the target thread; and
   in response to determining the first quality of service for the target thread, creating, by the computing device and in a wait list, an entry that a) represents the target thread, and b) includes the first quality of service for the target thread, wherein:
   determining whether the first quality of service for the target thread is higher than the second quality of service for the other thread comprises determining, using data for the first quality of service from the entry in the wait list, whether the first quality of service for the target thread is higher than the second quality of service for the other thread from the one or more threads that have corresponding entries in a signal list that indicates that there are sufficient resources allocated to execute the corresponding thread.

7. The method of claim 6, wherein creating the entry comprises:
   determining whether the wait list includes an existing entry for the target thread; and
   in response to determining that the wait list does not include an existing entry for the target thread, creating, in the wait list, the entry that a) represents the target thread, and b) includes the first quality of service for the target thread.

8. The method of claim 1, wherein:
   the intercept function comprises an intercept wait function; and
   intercepting the call comprises intercepting, using the intercept wait function, the call for a semaphore wait function by the target thread of the application that indicates that there are insufficient resources allocated to execute the target thread, the method comprising:
   calling the semaphore wait function to enqueue the target thread in a wait queue.

9. A system comprising one or more computers and one or more storage devices on which are stored instructions that are operable, when executed by the one or more computers, to cause the one or more computers to perform operations comprising:
   intercepting, by a computing device executing an application and using an intercept function for the application, a call for a target thread of the application that indicates that there are insufficient resources allocated to execute the target thread;
   determining, by the computing device, whether a first quality of service for the target thread is higher than a second quality of service for another thread from one or more threads, each thread in the one or more threads having sufficient resources allocated to execute the corresponding thread; and
   updating, by the computing device, hang data for the target thread that indicates a potential responsiveness issue for the target thread based at least in part on determining that the first quality of service for the target thread is higher than the second quality of service for the other thread.

10. The system of claim 9, wherein:
intercepting the call comprises intercepting the call that comprises a request to enqueue the target thread to a wait queue, the operations comprising:
detecting that the target thread is next in the wait queue, wherein:
determining whether the first quality of service for the target thread is higher than the second quality of service for the other thread is responsive to detecting that the target thread is next in the wait queue.

11. The system of claim 9, the operations comprising:
providing, by the computing device and for presentation, a notification identifying the target thread.

12. The system of claim 9, wherein the other thread comprises a main thread for the application,
the operations comprising determining the second quality of service for the main thread that indicates that the main thread performs one or more operations for a synchronous transmission or an input/output (I/O) operation.

13. The system of claim 9, the operations comprising:
providing, by the computing device and to another device, a frame for the call for the target thread that indicates that there are insufficient resources allocated to execute the target thread to cause the other device to determine whether the frame is actionable, and, in response to determining that the frame is actionable, cause presentation in an interface about information for the frame.

14. The system of claim 9, the operations comprising:
determining, by the computing device, the first quality of service for the target thread; and
in response to determining the first quality of service for the target thread, creating, by the computing device and in a wait list, an entry that a) represents the target thread, and b) includes the first quality of service for the target thread, wherein:
determining whether the first quality of service for the target thread is higher than the second quality of service for the other thread comprises determining, using data for the first quality of service from the entry in the wait list, whether the first quality of service for the target thread is higher than the second quality of service for the other thread from the one or more threads that have corresponding entries in a signal list that indicates that there are sufficient resources allocated to execute the corresponding thread.

15. The system of claim 14, wherein creating the entry comprises:
determining whether the wait list includes an existing entry for the target thread; and
in response to determining that the wait list does not include an existing entry for the target thread, creating, in the wait list, the entry that a) represents the target thread, and b) includes the first quality of service for the target thread.

16. The system of claim 9, wherein:
the intercept function comprises an intercept wait function; and
intercepting the call comprises intercepting, using the intercept wait function, the call for a semaphore wait function by the target thread of the application that indicates that there are insufficient resources allocated to execute the target thread, the operations comprising:
calling the semaphore wait function to enqueue the target thread in a wait queue.

17. One or more non-transitory computer storage media encoded with instructions that, when executed by one or more computers, cause the one or more computers to perform operations comprising:
intercepting, by a computing device executing an application and using an intercept function for the application, a call for a target thread of the application that indicates that there are insufficient resources allocated to execute the target thread;
determining, by the computing device, whether a first quality of service for the target thread is higher than a second quality of service for another thread from one or more threads, each thread in the one or more threads having sufficient resources allocated to execute the corresponding thread; and
updating, by the computing device, hang data for the target thread that indicates a potential responsiveness issue for the target thread based at least in part on determining that the first quality of service for the target thread is higher than the second quality of service for the other thread.

18. The computer storage media of claim 17, wherein:
intercepting the call comprises intercepting the call that comprises a request to enqueue the target thread to a wait queue, the operations comprising:
detecting that the target thread is next in the wait queue, wherein:
determining whether the first quality of service for the target thread is higher than the second quality of service for the other thread is responsive to detecting that the target thread is next in the wait queue.

19. The computer storage media of claim 17, the operations comprising:
providing, by the computing device and for presentation, a notification identifying the target thread.

20. The computer storage media of claim 17, wherein the other thread comprises a main thread for the application,
the operations comprising determining the second quality of service for the main thread that indicates that the main thread performs one or more operations for a synchronous transmission or an input/output (I/O) operation.

* * * * *